United States Patent
Kazdaghli et al.

(10) Patent No.: US 11,580,766 B2
(45) Date of Patent: Feb. 14, 2023

(54) METHOD FOR DETECTING AT LEAST ONE BIOMETRIC TRAIT VISIBLE IN AN INPUT IMAGE BY MEANS OF A CONVOLUTIONAL NEURAL NETWORK

(71) Applicant: Idemia Identity & Security France, Courbevoie (FR)

(72) Inventors: Laurent Kazdaghli, Courbevoie (FR); Guy Mabyalaht, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/304,520

(22) Filed: Jun. 22, 2021

(65) Prior Publication Data

US 2021/0406510 A1    Dec. 30, 2021

(30) Foreign Application Priority Data

Jun. 26, 2020 (FR) .................................. 2006730

(51) Int. Cl.
*G06V 40/13* (2022.01)
*G06V 10/25* (2022.01)
(Continued)

(52) U.S. Cl.
CPC ........... *G06V 40/13* (2022.01); *G06K 9/6256* (2013.01); *G06N 3/08* (2013.01); *G06V 10/25* (2022.01)

(58) Field of Classification Search
CPC .... G06V 40/13; G06V 10/25; G06V 40/1365; G06K 9/6256; G06N 3/08
See application file for complete search history.

(56) References Cited

U.S. PATENT DOCUMENTS

| 2018/0165508 A1* | 6/2018 | Othman ................. G06V 40/70 |
| 2020/0125824 A1* | 4/2020 | Mabyalaht .............. G06N 3/08 |
| 2020/0151309 A1* | 5/2020 | Thuillier .............. G06K 9/6267 |

FOREIGN PATENT DOCUMENTS

EP    3640843 A1    4/2020

OTHER PUBLICATIONS

Jana Arka Prava et al: "YOLO based Detection and Classification of Objects in video records", 2018 3rd IEEE International Conference On Recent Trends in Electronics, Information & Communication Technology (RTEICT), IEEE, May 18, 2018 (May 18, 2018), pp. 2448-2452, XP033724857, DOI: 10.1109/RTEICT42901.2018. 9012375 [extrait le Feb. 25, 2020] * le document en entier *.

(Continued)

*Primary Examiner* — Abhishek Sarma
(74) *Attorney, Agent, or Firm* — Womble Bond Dickinson (US) LLP

(57) ABSTRACT

A method for detecting at least one biometric trait visible in an input image, by means of a convolutional neural network, the method wherein it comprises the implementation, by data processing means of a client, of steps of: (a) Generating, by means of a feature extraction block of said CNN, a plurality of representation vectors each defining a candidate region of interest of said input image potentially containing a biometric trait, the representation vector of a candidate region of interest comprising at least one position value of the candidate region of interest, at least one size value of the candidate region of interest, an orientation value of the candidate region of interest, and an objectivity score of the candidate region of interest; (b) Selecting, by means of a filtering block of said CNN, at least one region of interest from said candidate regions based on the representation vectors thereof.

15 Claims, 3 Drawing Sheets

(51) Int. Cl.
  *G06K 9/62*   (2022.01)
  *G06N 3/08*   (2006.01)

(56) References Cited

OTHER PUBLICATIONS

Li Linhao et al: "A Novel CNN-Based Method for Accurate Ship Detection in HR Optical Remote Sensing Images via Rotated Bounding Box", IEEE transactions on geoscience and remote sensing, May 8, 2020 (May 8, 2020), pp. 686-699, XP055782272, DOI: 10.1109/TGRS.2020.2995477 Extra it de l 'Internet: URL:https://arxiv.org/pdf/2004.07124.pdf [extrait le Mar. 4, 2021] * le document en entier *.

Tang Siqi et al: An Efficient Slap Fingerprint Segmentation Algorithm Based on Convnets and Knuckle Line11 , Oct. 20, 2017 (Oct. 20, 2017), Big Data Analytics in the Social and Ubiquitous Context : 5th International Workshop on Modeling Social Media, MSM 2014, 5th International Workshop on Mining Ubiquitous and Social Environments, Muse 2014 and First International Workshop on Machine Le, XP047451335, ISBN: 978-3-642-17318-9 [extrait le Oct. 20, 2017] * le document en entier *.

Ouyang Jiahong et al: "Fingerprint pose estimation based on faster R-CNN", 2017 IEEE International Joint Conference on Biome 268-276, XP033308623, DOI: 10.1109/BTAS.2017.8272707 TRICS (IJCB), IEEE, Oct. 1, 2017 (Oct. 1, 2017), pages [extrait le Jan. 29, 2018]* Ie document en entier *.

* cited by examiner

[Fig. 1]
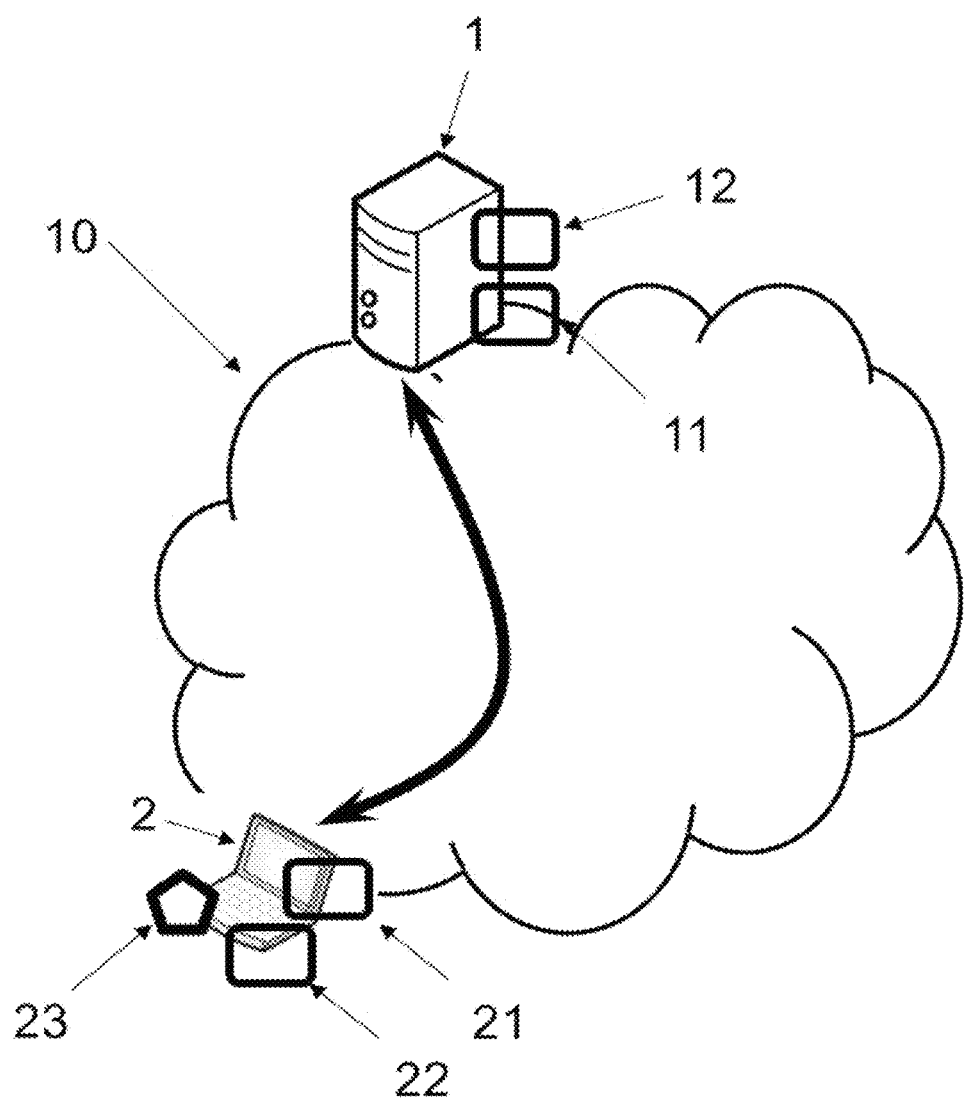

[Fig. 2]
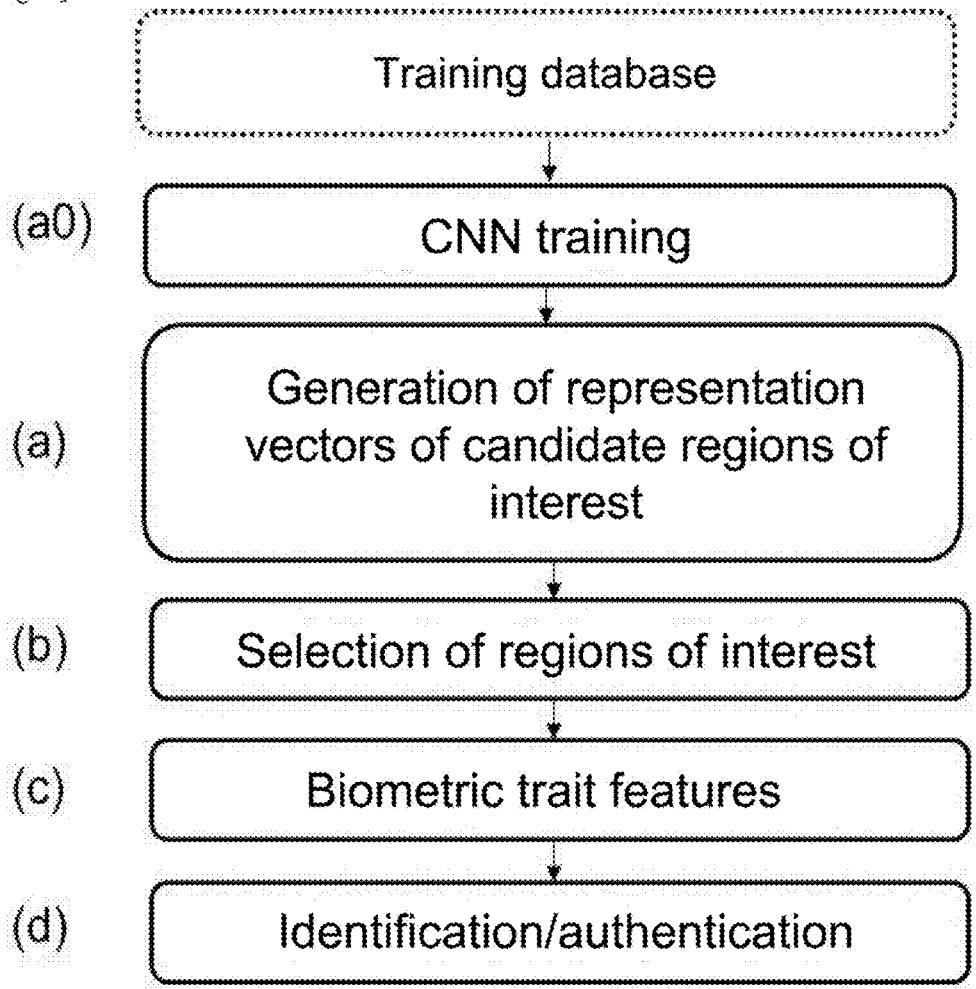
[Fig. 3a]
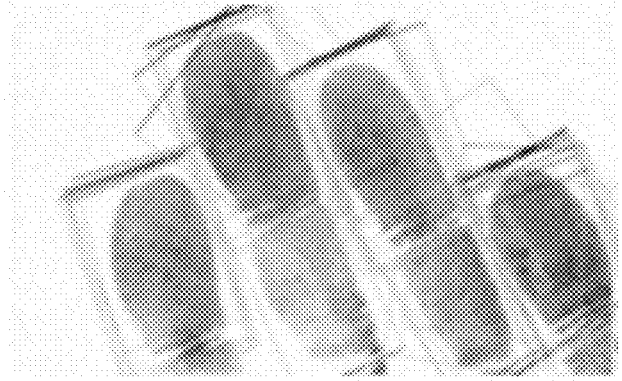

[Fig. 3b]
[Fig. 3c]

METHOD FOR DETECTING AT LEAST ONE BIOMETRIC TRAIT VISIBLE IN AN INPUT IMAGE BY MEANS OF A CONVOLUTIONAL NEURAL NETWORK

CROSS-REFERENCE TO RELATED APPLICATIONS

This application claims priority pursuant to 35 U.S.C. 119(a) to France Patent Application No. 2006730, filed Jun. 26, 2020, which application is incorporated herein by reference in its entirety.

GENERAL TECHNICAL FIELD

The invention relates to the field of biometrics and proposes in particular a method for detecting at least one biometric trait visible in an input image by means of at least one convolutional neural network, as well as a method for the training of the convolutional neural network.

STATE OF THE ART

Neural networks are massively used for data classification.

After an automatic training phase (generally supervised, meaning on an already classified reference database), a neural network "learns" and becomes capable on its own of applying the same classification to unknown data.

Convolutional neural networks (CNNs) are a type of neural network wherein the connection pattern between neurons is inspired by the visual cortex of animals. They are thus particularly suited to a specific type of classification, which is image analysis; indeed they allow efficient recognition of objects or people in images or videos, in particular in security applications (e.g. automatic surveillance, threat detection, etc.).

Quite specifically, the use of CNNs is known in the field of biometric authentication/identification. In fact, a CNN can be trained to recognize an individual on the basis of biometric traits of this individual such as fingerprints (fingerprint recognition), iris or face (facial recognition). Insofar as these data are manipulated in image form, the CNN proves very effective.

Conventional biometric approaches use characteristic information of the biometric trait extracted from the acquired biometry, called features, and the training/classification is done on the basis of the comparison of these features.

In particular, in the case of fingerprint recognition, fingertip images are processed so as to extract the features of a print. The method of extracting features from a print (in the form of feature maps) is called "encoding," which features make it possible to compose a signature called "template" encoding the useful information in the final phase of classification. More specifically, classification will be done by comparing feature maps obtained with one or more reference feature maps associated with known individuals.

Recent approaches in the field of deep learning have enabled significant advances, and it is currently possible, including for fingerprint recognition (which is the most complex), to avoid the encoding phase and to train/classify directly based on the biometric data, i.e. to represent the biometry by a reduced vector without it still be necessary to explicitly extract features; see for example application FR3088467 for fingerprint recognition.

However, while this works for an image in which the biometric trait is "isolated" (photo of the face or of a single fingerprint), known algorithms still encounter difficulties when there are potentially several biometric traits and it is necessary to locate them. This is typically the case when the input image shows a whole hand placed on a sensor (see FIGS. 3a-3c), which are referred to as "slaps". Typically, for taking prints for a passport, there are three shots: one of the four long fingers of the left hand, one of the four long fingers of the right hand, and one of the two thumbs side-by-side.

The solution, instead of directly processing the input image as an image of a biometric trait, is to implement a detection algorithm which will make it possible to extract the visible biometric traits from the image as regions of interest.

CNNs are known, such as those of the YOLO or RCNN families, which are capable of implementing such a detection based on regions of interest. These CNNs "propose" regions of an image which are potentially of interest (in the form of a box), which are filtered for a more discerning selection. These efficient models are satisfactory to identify the varied entities within images (for example animals, people, vehicles, etc.) but are insufficient for biometry and in particular in the example mentioned above of slaps, because they incorrectly detect traces of old prints on the sensor or phalanges, or else correct prints but which are incorrectly oriented (the hand may not be straight or even may be entirely upside-down if the sensor is on a table), and the abovementioned networks are not at all robust to such variations in orientation. Finally, these networks confuse the fingers with each other.

One approach would be to add the classes "trace" and "phalanx" to the training images, with the corresponding annotations, so that the CNNs learn to distinguish these objects from real prints; however, such work would be extremely tedious and would not solve the other problems.

It would consequently be desirable to have a novel solution for processing complex images representative of one or more biometric traits which is efficient and robust while remaining light.

SUMMARY

According to a first aspect, the present invention relates to a method for detecting at least one biometric trait visible in an input image, by means of a convolutional neural network, CNN, the method wherein it comprises the implementation, by data processing means of a client, of steps of:

(a) Generating, by means of a feature extraction block of said CNN, a plurality of representation vectors each defining a candidate region of interest of said input image potentially containing a biometric trait, the representation vector of a candidate region of interest comprising at least one position value of the candidate region of interest, at least one size value of the candidate region of interest, an orientation value of the candidate region of interest, and an objectivity score of the candidate region of interest;

(b) Selecting, by means of a filtering block of said CNN, at least one region of interest from said candidate regions based on the representation vectors thereof.

According to advantageous and non-limiting features:

Said biometric traits are chosen from fingerprints, faces and irises, in particular fingerprints.

Each candidate region of interest forms a bounding box.

The representation vector of a candidate region of interest comprises two position values of the candidate region of interest which are the coordinates of the center of the bounding box, two size values of the candidate region of interest which are the height thereof and the width thereof.

The orientation value of the candidate region of interest defines a rotation angle of the bounding box from a reference orientation.

The representation vector of a candidate region of interest further comprises, for at least one possible class of the biometric trait, a score of the probability of the biometric trait of the region of interest belonging to said class.

Said classes denote the fingers of the hands.

Step (b) comprises the suppression of candidate regions of interest which have, in their representation vector, an objectivity score below a predetermined threshold; and/or the selection, from at least one group of candidate regions of interest liable to contain the same biometric trait, of the candidate region of interest with the highest objectivity score; two candidate regions of interest being in particular liable to contain the same biometric trait if they have a Jaccard criterion greater than a predetermined threshold.

Step (b) comprises, for at least one candidate region of interest, the estimation of a quality score of the candidate region of interest, said score representing the probability that said candidate region of interest represents a biometric trait, independently of the already known objectivity score; said selection of at least one region of interest from said candidate regions being based on said quality score.

Step (b) comprises, for at least one candidate region of interest, the estimation of an orientation value of the biometric trait contained in the candidate region of interest, independently of the already known orientation value of said candidate region of interest, so as to correct this orientation value of said candidate region of interest.

The method comprises a prior step (a0) of training, by data processing means of a server, the parameters of the feature extraction block of said CNN, based on a base of training images in which the biometric traits have already been detected, using a cost function comprising a regression term relating to the orientation of the candidate region of interest.

Said cost function comprises:
a first regression term relating to the at least one position value of the candidate region of interest;
a second regression term relating to the at least one size value of the candidate region of interest;
a third regression term relating to the objectivity score of the candidate region of interest;
a fourth regression term relating to the orientation of the candidate region of interest;
an optional fifth regression term relating to a class of the candidate region of interest.

According to a second aspect, the invention relates to a method for training the parameters of a feature extraction block of a convolutional neural network, CNN, by data processing means of a server, for detecting at least one biometric trait visible in an input image, the method being implemented starting from a base of training images in which the biometric traits have already been detected, the feature extraction block generating, for an input image, a plurality of representation vectors each defining a candidate region of interest of said input image potentially containing a biometric trait; the method being characterized in that it uses a cost function comprising a regression term relating to the orientation of the candidate region of interest, the representation vector of a candidate region of interest comprising at least one position value of the candidate region of interest, at least one size value of the candidate region of interest, an orientation value of the candidate region of interest, and an objectivity score of the candidate region of interest.

According to a third and fourth aspect, the invention relates to a computer program product comprising code instructions for the execution of a method according to the first or second aspect of detecting at least one biometric trait visible in an input image, or for training parameters of a convolutional neural network, CNN; and a storage means readable by computer equipment on which a computer program product comprising code instructions for executing a method according to the first or second aspect for detecting at least one biometric trait visible in an input image, or for training parameters of a convolutional neural network, CNN, when said program is executed on a computer.

BRIEF DESCRIPTION OF THE DRAWINGS

Other characteristics and advantages of the present invention will appear upon reading the following description of a preferred embodiment. This description will be given with reference to the attached drawings in which:

FIG. 1 is a diagram of an architecture for implementing the method according to the invention;

FIG. 2 shows the steps of a preferred embodiment of the method according to the invention;

FIG. 3a shows a first example of a result of detection in an input image;

FIG. 3b shows a second example of a result of detection in an input image;

FIG. 3c shows a third example of a result of detection in an input image.

DETAILED DESCRIPTION

Architecture

According to two additional aspects of the invention, the following are proposed:
a method for detecting at least one biometric trait visible in an input image by means of a convolutional neural network (CNN);
a method for training parameters of the CNN.

The present methods are implemented within an architecture such as shown in [FIG. 1], using a server 1 and a client 2. The server 1 is the training device (implementing the training method) and the client 2 is a classification device (implementing the classification method), for example a user terminal. It is entirely possible that the two devices 1, 2 are the same.

In any case, each device 1, 2 is typically a remote computer equipment connected to an extended network 10 such as the Internet for the exchange of data. Each comprises data processing means 11, 21 of processor type and data storage means 12, 22 such as computer memory, for example a drive.

The server 1 stores a training database, i.e. a set of already annotated data (as opposed to "input" data which is precisely what is to be classified), i.e. the biometric traits have been detected in the form of reference regions of interest, highlighted and in this case labeled with the corresponding biometric trait category (see below); examples will be given below.

Indeed, the input or training data are of image type, and are representative of at least one biometric trait (in other words they are images of the biometric trait(s), i.e. on which the biometric trait(s) are visible), advantageously chosen from a fingerprint, a face and an iris of the user, and preferably a fingerprint (as will be seen, the present method is most particularly effective in the latter case). Preferably, the input or training images represent a plurality of biometric traits, i.e. the present method according to the first aspect is a method for detecting a plurality of biometric traits (at least two) visible in a single input image, which in practice may be a "complex" image showing much more than just the biometric trait. For facial detection, it is possible to have an image of a full scene with a whole person being visible, and for detecting fingerprints it is possible to have an image of all or part of the user's hand. In the remainder of the present description, three main examples of slaps will be taken in the case of finger recognition:

image of the four long fingers (index, middle, ring, pinky) of the left hand;
image of the four long fingers (index, middle, ring, pinky) of the right hand;
image of the two thumbs of the two hands (left and right) side-by-side.

Said base of print images thus preferentially contains a large number of these three types of annotated images.

"Detection" or "recognition" is a basic operation, and refers to the simple labeling of a biometric trait within the image. Detection thus combines the identification of a biometric trait as an element of interest, and the locating thereof (definition of a region of interest containing the biometric trait, in particular a bounding box, see below).

The detection of a biometric trait also preferably comprises the classification thereof, in particular from several different categories of the type of biometric trait, in particular to which finger a print belongs if the biometric trait is a fingerprint. For example, a detected fingerprint may be classified as "thumb, index, middle, ring or pinky" and "left or right" (10 classes in total).

As will be seen below, the method according to the first aspect may particularly preferably further comprise a recognition of an individual having the visible biometric trait(s) (authentication or identification of the individual by recognition of their biometric trait(s)), i.e. the image in question is an image of a part of this individual's body (typically their hand, as explained).

Method

The concept of the present method is to use known convolutional neural networks (CNNs) for detection, in particular YOLO or RCNN (in the remainder of the present description, the example of YOLO will be used, in particular in the MobileNet V2 implementation thereof), but to give them an ability to estimate an orientation of a region of interest.

More specifically, as is known, detection CNNs comprise a feature extraction block (or encoding block) that identifies candidate regions of interest of an input image, and more specifically that generates representation vectors of each of these candidate regions of interest (generally a plurality, in particular S×S×B for YOLO, with S×S being the number of cells of the input image—for example 7×7—and B being the number of possible candidate regions of interest per cell—for example 1 or 2).

This representation vector comprises a plurality of parameters defining the corresponding candidate region of interest, including at least one position value of the candidate region of interest, at least one size value of the candidate region of interest, and an objectivity score of the candidate region of interest.

Regarding the size and position values, there are numerous possibilities depending on the geometric shape of the region of interest.

Each region of interest is preferably a polygon and in particular a rectangle, i.e. forms a bounding box, and there are then typically two position values, x+y (coordinates of the center of the box) and two size values, w and h (height and width of the box). These values are generally between 0 and 1 (i.e. standardized by the size of the input image).

The objectivity score C, or confidence score, represents the probability of the presence of a biometric trait in the corresponding region of interest. As will be seen below, if a classification is implemented, the vector may further comprise other scores and in particular probabilities P(c) of the biometric trait of the region of interest belonging to various possible classes (referred to as conditional class probabilities) or else directly the number of the class with the highest probability.

It is thus well known for YOLO to have the vector (x, y, w, h, C) for a region of interest, aside from any class scores.

The present method proposes adding an orientation value θ of the candidate region of interest thereto. More specifically, while all the boxes conventionally have the same orientation (the same as the image, i.e. with the sides parallel to those of the image, insofar as YOLO is designed to process images of ordinary scenes with the ground horizontal in this case), the present method permits the rotation of the boxes so as to enable the detection of the prints just as effectively even if they are incorrectly oriented which, as explained, happens very frequently for slaps images, for example. It can be seen for example in [FIG. 3a] that this makes it possible to propose several candidate regions of interest for a print, which regions only differ in their orientation.

Thus, it will be understood that the orientation value θ of the candidate region of interest is not, for example, a simple estimation of the orientation of the biometric trait contained in the region of interest, but is indeed a value defining the orientation of the region of interest as a geometric shape. Thus, "re-oriented" regions of interest can be obtained, especially by rotation, as, for example, tilted bounding boxes are not anymore with the sides parallel to those of the image. The result is that, if θ is chosen well, the biometric trait can in fine be correctly oriented in the candidate region of interest even it was not the case in the image. It should be noted that the present invention does not exclude a later estimation of the orientation of the biometric trait contained in the region of interest (potentially re-oriented), for verification purposes (see below).

It is understood that said orientation θ is with respect to a so-called reference orientation corresponding to an arbitrarily chosen orientation and defining a "normal" orientation of the region of interest (typically bounding boxes with the sides parallel to those of the image). In other words, θ is thereby a rotation angle, i.e. a difference of orientation: if θ=0, the region of interest presents the reference orientation.

Said reference orientation preferably coincides with an optimal orientation of the biometric trait in the image, i.e. the one in which the trait is "well oriented", corresponding to the usual orientation in the reference biometric databases. For example, in the cases of fingerprints, the optimal orientation is the one in which the finger is oriented vertically and upwards, referred to as "North-South", i.e. the natural orientation when a finger is pressed on a sensor in good conditions, corresponding to the usual one of reference fingerprint databases. In the case of an iris or a face, the optimal orientation is the one in which the face presents the chin at the bottom and the forehead at the top. It is known that the biometric traits presenting substantially the optimal orientation will be easier to detect because it is the expected orientation by the CNN.

The fact that the reference orientation and the optimal orientation coinde means that when a biometric trait presents said optimal orientation in the image, it always presents this optimal orientation in a candidate region of interest presenting the reference orientation (i.e. having an orientation value equals to 0), and, thus, it will be easy to detect. So, it is understood similarly that, when a biometric trait does not present said optimal orientation in the image, it does not present this optimal orientation in a candidate region of interest presenting the reference orientation, but an orientation value θ can be found, so that the biometric trait presents however this optimal orientation in the candidate region of interest presenting an orientation in compliance with the orientation value θ (i.e. rotated by θ from the reference orientation).

Thus, the orientation value θ can be expressed as an angle value, for example in the counterclockwise direction (positive when the region of interest is rotated counterclockwise, otherwise negative).

It can for example be chosen in a range of [0°, 360°] or, in an equivalent manner, in a range of [−180°, +180°]. In addition, a 360° range is preferred since it corresponds to the whole of the possible orientations, but it will be understood that it would eventually be possible to work with a more reduced range corresponding to the majority of the noticed orientations, for example [−45°, +45°].

To sum up, the best orientation value θ of a candidate region of interest is the one so that the biometric trait which is contained in it presents substantially said optimal orientation in the referential of said region of interest. For example:

for a fingerprint already well oriented (North-South), the region of interest does not need to be rotated and the best value θ is 0 (since the fingerprint is already well oriented in a "normal" box i.e. presenting the reference orientation);

for a fingerprint tilted in the image by an angle x from the optimal orientation, the optimal value θ is x since, in the referential of a box tilted by an angle θ from the reference orientation, the fingerprint is only tilted by an angle x-θ from the optimal orientation, which tends towards 0 (i.e. the fingerprint orientation tends towards the North-South direction) when θ tends towards x.

The present solution highly improves the performances for tilted biometric traits, that is to say tilted from the optimal orientation by an angle away from a multiple of 90° (for example 45°) in the situations where the regions of interest constitute rectangular bounding boxes. Indeed, for such orientations, the boxes presenting the reference orientation (with the sides parallel to those of the image) are particularly inappropriate. In comparison, a network like YOLO will encounter less problems with a biometric trait tilted of 90° from the orientation reference (for example a "East-West" fingerprint) because it will enter well in a box presenting the reference orientation even if the height and the width are switched.

However, the person skilled in the art will understand that it is always possible to start from any reference orientation or optimal orientation.

Thus, with reference to [FIG. 2], the present method begins with a step (a) of generating, by the data processing means 21 of the client 2, by means of a feature extraction block of said CNN, a plurality of representation vectors of a candidate region of interest of said input image potentially containing a biometric trait, said representation vector of a candidate region of interest comprising at least one position value of the candidate region of interest, at least one size value of the candidate region of interest, an orientation value of the candidate region of interest, and an objectivity score of the candidate region of interest (and preferentially two position values, two size values, an orientation value, an objectivity score value [i.e. 6 values x, y, w, h, θ, C] and any class scores [for example 10 P(c) values if there are 10 classes corresponding to the 10 fingers]).

It is understood that step (a) is a step for identifying a plurality of candidate regions of interest.

Being able to obtain an additional value in the representation vector is achieved simply by adding a filter at least in the final block, but it is possible to retain a known architecture. For example, using YOLO, it is possible to have a block consisting of a plurality of convolutional layers (up to 24), a final one of which generates, as output, a large number P (for example 1024) of feature maps of size S×S so as to form a block of size S×S×P (i.e. there is a vector of size P per cell), followed by two entirely connected layers, the first to "flatten" this output and the second to generate the representation vectors (i.e. output of size S×S×V where V is the size of the vector, for example 16 if there is 1 box per cell and 10 possible classes). Examples of cost functions to be able to train the feature extraction block of a CNN will be seen below.

This step may be direct (in a single step, such as in YOLO for example) or may go via a sub-step of proposing candidate regions of interest before the extraction of vectors, such as in RCNN.

Selecting the Regions of Interest

It is understood that, at the end of step (a), there are a large number of candidate regions of interest, in any case many more than the actual number of biometric traits visible in the image, all the more so since "extending" the representation vector by adding the orientation increases the size thereof, such that, for a single biometric trait, there are "duplicates" of boxes of varied sizes and orientations. This can be seen very clearly in FIG. 3a.

Consequently, in a step (b), at least one region of interest is selected from said candidate regions based on their representation vectors. This is a step of filtering the plurality of candidate regions of interest identified (implemented by a filtering block of said CNN).

Thus, at the end of step (b), each region of interest selected is considered to contain a biometric trait, and this therefore constitutes a "detection" of this biometric trait. In other words, step (b) consists in identifying the candidate regions of interest most likely to contain a biometric trait and in suppressing the others, and thus to finish.

This step of selection may be carried out in any known way and YOLO already contains such a filtering block, implementing a selection referred to as NMS (Non-Maximal Suppression). In particular:

it is possible to suppress all candidate regions of interest which have, in their representation vector, an objectivity score below a predetermined threshold (for example 0.25);

and/or from the "groups" of candidate regions of interest likely to contain the same biometric trait (i.e. substantially overlapping; it can be seen for example in FIG. 3a that, for each print, there are groups of around ten different bounding boxes bounding this print more or less closely), keeping the one with the highest objectivity score. It should be noted that it is possible to use, as criterion for forming these groups of candidate regions of interest, the Jaccard criterion, also referred to as "Intersection over union" (IoU): if two candidate regions of interest have a Jaccard criterion greater than a predetermined threshold (for example 0.4), they are likely to contain the same biometric trait;

it is possible to carry out several rounds, varying the thresholds.

In one embodiment, the number of biometric traits to be detected in the input image is known (for example four if it is an image of the long fingers of one hand or two if it is the thumbs), and it is possible to implement step (b) until the number of selected regions has been reduced to this number plus or minus a factor (for example, it is possible to permit an extra finger).

In one embodiment, in step (c), potential classes of biometric trait (and more specifically the associated probability scores) are taken into account using the assumption that the input image cannot simultaneously comprise two biometric traits from the same category (there cannot be two left index fingers, for example).

Quality Estimation

The present method substantially improves the ability to best detect biometric traits, i.e. to have the best selected and most realistic bounding boxes, as can be seen for example in [FIG. 3b].

Tests were carried out on a training base composed of 30,000 images containing either images of 4 fingers (left or right hand) or two fingers (left and right thumbs) at a resolution of 500 dpi.

In order to improve the robustness of the CNN, enhancements of the training data were carried out, and in particular rotations were applied to some images, and backgrounds were added to other images (marks, writing, etc.) in order to make the network capable of working under a wide variety of conditions.

The results show that all the fingers present in the test images are always correctly detected with good precision, and the network is also robust to orientation. It is also noted that the system deals very well with "extra" or "missing" fingers, if for example the person positioned their hands incorrectly.

However, as can be seen in said FIG. 3b, it remains possible that phalanges could still be erroneously detected as biometric traits.

In fact, it is observed that the objectivity scores for phalanges or traces are on average close to those of degraded fingers (up to 0.5), while very good quality fingers on average have scores greater than 0.7, the maximum being 1. It is therefore difficult to distinguish phalanges from degraded fingers only based on the objectivity score (if too high a threshold is set or too low a number of detections is set, fingers will be lost).

Thus, step (b) preferably comprises, for all or some of the candidate regions of interest (it is possible to have already suppressed those with the lowest objectivity score), the estimation of a quality score of the candidate region of interest, said score representing the probability that said candidate region of interest represents a biometric trait, independently of the already known objectivity score.

More specifically, the input image is "reframed" at the region of interest and in parallel a processing to verify that it does indeed contain a biometric trait is carried out. For example, use is made of a classifier which returns a probability score, this score being used as the quality score.

It is then possible to implement the selection of the regions of interest to be retained, this time based either directly on the quality score instead of the objectivity score, or based on a combination of both (their average, for example).

As can be seen in [FIG. 3c], this makes it possible to very effectively exclude false detections such as phalanges or traces, and the detection result is perfect.

Orientation Verification

The final difficulty that may remain is a one-time orientation error.

More precisely, the box may appear to be perfectly well placed, but proves in fact to be "upside-down". More specifically, there is an orientation error of approximately 180°, causing the top and the bottom of the region of interest to be inverted. Indeed, a fingerprint is approximately oval in shape, and it is understood that an oval turned by a half-turn (i.e. 180°) still has an oval shape, which explains how an upside-down print can still be recognized by a CNN such as YOLO as a print, which would not be the case for a rotation by a smaller or larger angle. Such a 180° is liable to occur in particular when the whole image is the wrong way up (hand placed upside-down on the sensor).

To this end, step (b) may also comprise, for all or some of the candidate regions of interest (again, it is possible to have already suppressed those with the lowest objectivity score), the estimation of an orientation value of the biometric trait contained in the candidate region of interest, independently of the already known orientation value $\theta$ of the region of interest. It is recalled that, this time, it is about estimating, in the referential of the region of interest, the difference between the orientation of the biometric trait and the optimal orientation. Normally, if the value $\theta$ is well chosen, this orientation value of the biometric trait must be close to 0 because the biometric trait should be well oriented in the region of interest, so that the orientation value of the biometric trait can be seen as an error estimation in the orientation value of the region of interest.

Thus, the orientation value of the region of interest can be "corrected" by adding to it the orientation value of the biometric trait contained in this region of interest, for example if the latter is greater than a threshold or in an interval.

As above, it is possible to "reframe" the input image at the region of interest and in parallel carry out a processing to calculate the orientation. For example, dedicated CNNs are known which are able to classify a print according to various orientation value intervals, see application FR3088467.

If a value close to 180° (for example in a range of [90°, 270°]), is obtained as an orientation value of the biometric trait, it is known that it is upside-down and the candidate region of interest is turned around (by adding, as explained, the latter value to the orientation value of the region of interest).

Training Method

As explained, the server 1 stores an already-annotated training database, i.e. a set of images in which the biometric traits have already been detected (as opposed to what are referred to as input images, which are in fact to be processed with the present method).

As can be seen in FIG. 2, the method advantageously starts with a step (a0) of training, by the data processing means 11 of the server 1, the parameters of said CNN, and in particular the feature extraction block (the filtering block may be predetermined and therefore not have any parameters to train), based on said base of already annotated images of biometric traits. "Annotated" is intended to mean that "reference" regions of interest containing biometric traits (and more specifically the representation vectors thereof) are already known for the training images. It is noted that, starting from a traditional base, this necessitates adding the orientation to each reference region of interest, but this can be done automatically by means of a suitable CNN, for example (see above).

Conventionally, for the training, use is made of a cost function making it possible to measure the distance between the predictions of the CNN (the candidate regions of interest) and the ground truth (reference regions of interest) for a training image. More specifically, the cost function makes it possible to measure a "distance" between the candidate regions of interest identified during the training and the expected reference regions of interest.

However, what is specific here is that the cost function must comprise a regression term relating to the orientation of the regions of interest compared to a standard cost function. For example, it is possible to start with the cost function known from YOLO and to add such a term thereto.

Said cost function preferably comprises:
a first regression term relating to the at least one position value of the candidate region of interest;
a second regression term relating to the at least one size value of the candidate region of interest;
a third regression term relating to the objectivity score of the candidate region of interest;
said fourth regression term relating to the orientation of the candidate region of interest;
an optional fifth regression term relating to a class of the candidate region of interest (if the CNN carries out classification).

The person skilled in the art will be able to use any cost function of their choosing by adapting it to the present invention by adding a regression term relating to the orientation thereto.

In the example of YOLO, with bounding boxes as regions of interest (vector [x, y, w, h, θ, C, P(c$_1$) ... P(c$_n$)]) it is possible to take the following terms (the cost function is the sum thereof):

[math 1]
$$\alpha_{coord}\sum_{i=0}^{S^2}\sum_{j=0}^{B}1_{ij}^{obj}\left[(x_i - \hat{x}_i)^2 + (y_i - \hat{y}_i)^2\right] \quad (1)$$

[math 2]
$$\alpha_{coord}\sum_{i=0}^{S^2}\sum_{j=0}^{B}1_{ij}^{obj}\left[\left(\sqrt{w_i} - \sqrt{\hat{w}_i}\right)^2 + \left(\sqrt{h_i} - \sqrt{\hat{h}_i}\right)^2\right] \quad (2)$$

[math 3]
$$\sum_{i=0}^{S^2}1_i^{obj}\sum_{c\in classes}(P_i(c) - \hat{P}_i(c))^2 \quad (3)$$

[math 4]
$$\alpha_{angle}\sum_{i=0}^{S^2}\sum_{j=0}^{B}1_{ij}^{obj}\left[(\sin(\theta_i) - \sin(\hat{\theta}_i))^2 + (\cos(\theta_i) - \cos(\hat{\theta}_i))^2\right] \quad (4)$$

[math 5]
$$\sum_{i=0}^{S^2}\sum_{j=0}^{B}1_{ij}^{obj}(C_i - \hat{C}_i)^2 + \sum_{i=0}^{S^2}\sum_{j=0}^{B}1_{ij}^{noobj}(C_i - \hat{C}_i)^2 \quad (5)$$

The values with or without "^" denote, respectively, the candidate region of interest and the reference region of interest (ground truth), with $\alpha_{coord}$ being the weight given to the first and second terms (regression relating to position and size) and $\alpha_{angle}$ being the weight on the fourth term (regression relating to orientation). The value $S^2$ indicates, as explained, the number of cells (grid of dimension S×S), B is the number of boxes in a cell (1 in our case, for example). Use is made of two masks ($1_i^{obj}$ and $1_i^{noobj}$) for each cell. If a cell contains an object, $1_i^{obj}$ is 1, and 0 otherwise; if a cell does not contain an object, $1_i^{noobj}$ is 1, otherwise 0.

The trained CNN may be stored if appropriate on data storage means 22 of the client 2 for use in detection. It should be noted that the same CNN can be embedded on numerous clients 2, only one training is necessary.

According to a third aspect, the invention may relate to the method for training the parameters of the feature extraction block of the CNN itself, implemented by the data processing means 11 of the server 1, for detecting at least one biometric trait visible in an input image (i.e. for implementing the method according to the first aspect).

This method, as explained, is implemented starting from a base of training images in which the biometric traits have already been detected, the feature extraction block generating, for an input image, a plurality of representation vectors each defining a candidate region of interest of said input image potentially containing a biometric trait.

In particular, the method uses a cost function comprising a regression term relating to the orientation of the candidate region of interest (see above), the representation vector of a candidate region of interest comprising at least one position value of the candidate region of interest, at least one size value of the candidate region of interest, an orientation value of the candidate region of interest, and an objectivity score of the candidate region of interest.

Identification/Authentication

Once the selection (b) has been implemented, the method according to the first aspect may comprise a step (c) in which the region(s) of interest selected from the input image can be processed so as to extract sought features of the biometric trait(s) visible in said input image, which may in particular include the position and/or orientation of minutiae in the case of fingerprints. In other words, step (c) is a step of processing the biometric trait(s) detected.

Step (c) is advantageously implemented for each biometric trait in isolation.

The method preferably further comprises a step (d) of identifying or authenticating at least one individual by comparing the desired features extracted from the (or each) biometric trait visible in said input image, with the features of reference biometric traits, which may be implemented in any manner known to a person skilled in the art.

For example, the client 2 may store the features of the prints of one or more persons entered in a police file as reference prints, so as to be able to identify the person who left a latent print: if the features extracted match those expected from a known individual, the identity of that individual is transmitted to the police forces.

Alternatively, the client 2 may send the extracted features to a remote database of said reference biometric trait features, for identification of the individual.

It should be noted that steps (c) and/or (d) can be implemented as step for classifying an isolated biometric trait, for example via one or more dedicated CNNs, and if appropriate can comprise enhancement processing of the isolated traits, see in particular application FR3088467.

Computer Program Product

According to a third and a fourth aspects, the invention relates to a computer program product comprising code instructions for executing (in particular on the data processing means 11, 21 of the server 1 and/or of the client 2) a method for detecting at least one biometric trait visible in an input image, or for training parameters of a convolutional neural network, CNN, and also storage means readable by computer equipment (a memory 12, 22 of the server 1 and/or of the client 2) on which this computer program product is located.

The invention claimed is:

1. A method for detecting at least one biometric trait visible in an input image, by means of a convolutional neural network, CNN, the method wherein it comprises the implementation, by data processing means (21) of a client (2), of steps of:
   (a) Generating, by means of a feature extraction block of said CNN, a plurality of representation vectors each defining a candidate region of interest of said input image potentially containing a biometric trait, the representation vector of a candidate region of interest comprising at least one position value of the candidate region of interest, at least one size value of the candidate region of interest, an orientation value of the candidate region of interest, and an objectivity score of the candidate region of interest;
   (b) Selecting, by means of a filtering block of said CNN, at least one region of interest from said candidate regions based on the representation vectors thereof.

2. The method according to claim 1, wherein said biometric traits are selected from fingerprints, faces and irises, in particular fingerprints.

3. The method according to claim 2, wherein the orientation value of the candidate region of interest defines an angle of rotation of the bounding box from a reference orientation.

4. The method according to claim 2, wherein said classes denote the fingers of the hands.

5. The method according to claim 1, wherein each candidate region of interest forms a bounding box.

6. The method according to claim 5, wherein the representation vector of a candidate region of interest comprises two position values of the candidate region of interest which are the coordinates of the center of the bounding box, two size values of the candidate region of interest which are the height thereof and the width thereof.

7. The method according to claim 1, wherein the representation vector of a candidate region of interest further comprises, for at least one possible class of the biometric trait, a score of the probability of the biometric trait of the region of interest belonging to said class.

8. The method according to claim 1, wherein step (b) comprises the suppression of candidate regions of interest which have, in their representation vector, an objectivity score below a predetermined threshold;
   and/or the selection, from at least one group of candidate regions of interest liable to contain the same biometric trait, of the candidate region of interest with the highest objectivity score; two candidate regions of interest being in particular liable to contain the same biometric trait if they have a Jaccard criterion greater than a predetermined threshold.

9. The method according to claim 1, wherein step (b) comprises, for at least one candidate region of interest, the estimation of a quality score of the candidate region of interest, said score representing the probability that said candidate region of interest represents a biometric trait, independently of the already known objectivity score; said selection of at least one region of interest from said candidate regions being based on said quality score.

10. The method according to claim 1, wherein step (b) comprises, for at least one candidate region of interest, the estimation of an orientation value of the biometric trait contained in the candidate region of interest, independently of the already known orientation value of said candidate region of interest, so as to correct this orientation value of said candidate region of interest.

11. The method according to claim 1, comprising a prior step (a0) of training, by data processing means (11) of a server (1), the parameters of the feature extraction block of said CNN, based on a base of training images in which the biometric traits have already been detected, using a cost function comprising a regression term relating to the orientation of the candidate region of interest.

12. The method according to claim 11, wherein said cost function comprises:
   a first regression term relating to the at least one position value of the candidate region of interest;
   a second regression term relating to the at least one size value of the candidate region of interest;
   a third regression term relating to the objectivity score of the candidate region of interest;
   a fourth regression term relating to the orientation of the candidate region of interest;
   an optional fifth regression term relating to a class of the candidate region of interest.

13. A non-transitory computer program product comprising code instructions for implementing a method according to claim 1 for detecting at least one biometric trait visible in an input image, or for training parameters of a convolutional neural network, CNN, when said program is executed on a computer.

14. A non-transitory storage means readable by computer equipment on which a computer program product is stored comprising code instructions for executing a method according to claim 1 for detecting at least one biometric trait visible in an input image, or for training parameters of a convolutional neural network, CNN, when said program is executed on a computer.

15. A method for training the parameters of a feature extraction block of a convolutional neural network, CNN, by data processing means (11) of a server (1), for detecting at least one biometric trait visible in an input image, the method being implemented starting from a base of training images in which the biometric traits have already been detected, the feature extraction block generating, for an input image, a plurality of representation vectors each defining a candidate region of interest of said input image potentially containing a biometric trait;
   the method wherein it uses a cost function comprising a regression term relating to the orientation of the candidate region of interest, the representation vector of a candidate region of interest comprising at least one position value of the candidate region of interest, at least one size value of the candidate region of interest, an orientation value of the candidate region of interest, and an objectivity score of the candidate region of interest.

* * * * *